(12) United States Patent
Lee et al.

(10) Patent No.: US 11,445,343 B2
(45) Date of Patent: Sep. 13, 2022

(54) TELEMATICS SYSTEM, METHODS AND APPARATUS FOR TWO-WAY DATA COMMUNICATION BETWEEN VEHICLES IN A FLEET AND A FLEET MANAGEMENT SYSTEM

(71) Applicant: AVIS BUDGET CAR RENTAL, LLC, Parsippany, NJ (US)

(72) Inventors: Sang J. Lee, Montclair, NJ (US); Syed Naveed Ghalib, Framingham, MA (US)

(73) Assignee: AVIS BUDGET CAR RENTAL, LLC, Parsippany, NJ (US)

( * ) Notice: Subject to any disclaimer, the term of this patent is extended or adjusted under 35 U.S.C. 154(b) by 115 days.

(21) Appl. No.: 16/742,065

(22) Filed: Jan. 14, 2020

(65) Prior Publication Data

US 2020/0196121 A1    Jun. 18, 2020

Related U.S. Application Data

(63) Continuation of application No. 15/496,338, filed on Apr. 25, 2017, now Pat. No. 10,536,827, which is a
(Continued)

(51) Int. Cl.
| | |
|---|---|
| *H04W 4/44* | (2018.01) |
| *G06Q 10/06* | (2012.01) |
| *H04W 4/029* | (2018.01) |
| *G08G 1/00* | (2006.01) |
| *B60R 25/04* | (2013.01) |

(Continued)

(52) U.S. Cl.
CPC .............. *H04W 4/44* (2018.02); *B60R 25/04* (2013.01); *B60R 25/10* (2013.01); *B60R 25/2018* (2013.01); *G06Q 10/02* (2013.01); *G06Q 10/063114* (2013.01); *G06Q 30/0645* (2013.01); *G06Q 50/30* (2013.01); *G07C 5/008* (2013.01); *G07C 5/02* (2013.01); *G08C 17/02* (2013.01);
(Continued)

(58) Field of Classification Search
CPC ........ H04W 4/44; H04W 4/029; B60R 25/04; B60R 25/10; B60R 25/2018; G06Q 10/02; G06Q 30/0645; G06Q 50/30; G06Q 10/063114; G07C 5/008; G07C 5/02; G08C 17/02; H04L 67/34; H04Q 9/00; G08G 1/202
See application file for complete search history.

(56) References Cited

U.S. PATENT DOCUMENTS

2016/0086393 A1* 3/2016 Collins ................ G07C 5/0808
                                                        701/31.5

\* cited by examiner

*Primary Examiner* — Michael V Kerrigan
(74) *Attorney, Agent, or Firm* — Wayne Edward Ramage; Baker Donelson

(57) ABSTRACT

Programmable telematics systems, methods and apparatus for two-way transmission of data and information between fleet vehicles and a fleet management system. The systems and methods employ a programmable telematics communications unit (TCU) configured to connect to the OBD II port of a vehicle, enabling two-way transmission of data and information between a fleet management system and vehicles in the fleet. The TCU device includes cellular data connectivity enabling communication with the management system through existing cellular telephone networks. The programmable TCU may be toggled between multiple operating modes, wherein the TCU provides different functionality, such that a single vehicle may participate in multiple vehicle programs at different points in time, including separate vehicle rental and vehicle sharing programs.

17 Claims, 9 Drawing Sheets

Related U.S. Application Data continuation of application No. 14/500,750, filed on Sep. 29, 2014, now Pat. No. 9,635,518.

(51) Int. Cl.
| | |
|---|---|
| *B60R 25/10* | (2013.01) |
| *B60R 25/20* | (2013.01) |
| *G06Q 10/02* | (2012.01) |
| *G06Q 30/06* | (2012.01) |
| *G06Q 50/30* | (2012.01) |
| *G07C 5/00* | (2006.01) |
| *G07C 5/02* | (2006.01) |
| *G08C 17/02* | (2006.01) |
| *H04L 67/00* | (2022.01) |
| *H04Q 9/00* | (2006.01) |

(52) U.S. Cl.
CPC ............ *G08G 1/202* (2013.01); *H04L 67/34* (2013.01); *H04Q 9/00* (2013.01); *H04W 4/029* (2018.02)

TELEMATICS SYSTEM, METHODS AND APPARATUS FOR TWO-WAY DATA COMMUNICATION BETWEEN VEHICLES IN A FLEET AND A FLEET MANAGEMENT SYSTEM

This application is a continuation of U.S. patent application Ser. No. 15/496,338, filed Apr. 25, 2017, which is a continuation of U.S. patent application Ser. No. 14/500,750, filed Sep. 29, 2014, and is entitled to that filing date for priority. The specifications, figures, and complete disclosures of U.S. patent application Ser. No. 14/500,750 and Ser. No. 15/496,338 are incorporated herein in their entireties by specific reference for all purposes.

FIELD OF THE INVENTION

The present invention relates to telematics systems, methods and apparatus that enable two-way communication between vehicles in a fleet and a fleet management system. The invention enables telematics components in vehicles within a fleet to be programmed so that different functionality can be provided to different vehicles in the fleet. Moreover, the programming for a given vehicle can be changed at different points in time, thereby enabling a single vehicle in the fleet to be utilized in multiple vehicle programs at different points in time, with appropriate functionality for the each program being provided by the telematics components.

BACKGROUND OF INVENTION

Nearly all vehicles now include sensors and computer systems for monitoring the operational status and performance of vehicle systems and components. Some vehicles also include telematics units for capturing sensor data and system information, and for communicating such data and information to an outside data center. However, existing systems have numerous limitations. For example, some systems avoid the use of cellular communication capability due to the cost of cellular data transmission, the complexity of incorporating such technology into each vehicle in the fleet, and the power requirements associated with such communication capability.

Prior systems seek to overcome these difficulties by using limited distance RF communication capability instead of cellular communication capability. For example, U.S. Pat. No. 8,370,268 describes a system where telematics data is communicated from a vehicle to a central database via a transmitter/receiver in the vehicle and sensors positioned around a facility. Such system includes only medium range communication capabilities, and does not enable communication with the vehicle when it is located outside of the facility. Likewise, U.S. Pat. No. 7,356,494 is directed at a wireless communication system which employs separately installed wireless infrastructure with storage and processing capability. This system enables a wireless device in the vehicle to communicate locally with the wireless infrastructure, which thereafter communicates on a periodic basis with the management system. In this system, the vehicles communicate only when positioned near the intelligent wireless infrastructure, and the cost of installing and maintaining the wireless infrastructure is prohibitive.

Additional systems in the marketplace require complex installation, such as manual hardwiring of the telematics unit to sensors and systems in each vehicle. Unfortunately, the time and labor required for such manual installation makes it prohibitively expense and impractical for use in a fleet of vehicles, particularly where the fleet contains different vehicle makes and models and where the fleet vehicles are being replaced every two or three years.

The technology described in prior systems also does not allow a fleet owner to readily manage vehicle operations where data collection and vehicle system functionality differ from one fleet vehicle to another fleet vehicle, or where different data collection and vehicle system functionality is required in a single vehicle at different points in time. This means that current technologies do not enable a fleet owner to manage a fleet where fleet vehicles can participate in multiple vehicle programs.

SUMMARY OF INVENTION

The present invention is directed to methods, systems and apparatus for communicating data and information between a vehicle and a fleet management system. The invention employs a telematics control unit ("TCU") installed in the vehicle and connected to the On Board Diagnostics II port ("OBD II") of the vehicle. By connecting the TCU to the OBD II port, the TCU is able to be powered by vehicle energy sources. Further, the OBD II connection enables the TCU to receive data and information from existing vehicle sensors and computing systems. This connection ability enables the TCU to be easily and quickly installed as an after-market device in fleet vehicles, without the need for time-consuming manual direct wiring of the TCU to vehicle sensors and systems, including the controller area network ("CAN bus").

Direct connection of the TCU to the OBD II port enables the TCU to communicate through the OBD II port with OEM installed sensors, electronics and operating systems, thereby enabling the TCU to engage in two-way communications with certain existing vehicle components. When installed in a vehicle, and programmed for operation in connection with the specific vehicle and OBD II device to which it is connected, the TCU may execute specific actions within a vehicle, such as activating vehicle systems and components including the lights, horn and door locks, etc. The TCU can also be programmed to disable or deactivate certain vehicle systems and components, such as the vehicle ignition or starter. This capability is very useful where the vehicle may be used by different people in different vehicle programs, such as a rental program, a sharing program and corporate or municipal fleet program.

The TCU of the present invention includes hardware and software that enables it to engage in two-way data communication with a remote fleet management system via existing cellular telephone networks. Two-way cellular communication enables the management system to receive data and information directly from the TCU, and to transmit data and information directly to the TCU wherever the vehicle is located. This makes it simple for the management system to transmit firmware updates and software necessary for operation of the TCU. Two-way cellular communication further enables the management system to determine whether correct and complete programming information has been received by the TCU and to receive, on a continuous or periodic basis, operating data and information from the vehicle. Since the communication hardware and software is part of the TCU, the TCU can also communicate with the management system when, for example, the TCU is disconnected or removed from the vehicle.

The connection of the TCU to the vehicle OBD II port enables the TCU to read the vehicle VIN, and transmit the vehicle VIN, so that the fleet management system can associate the TCU with a specific vehicle. Once this information is received by the management system, firmware and software updates necessary for proper operation of the TCU with that particular vehicle can be transmitted from the management system to the TCU. As long as the management system contains programming for each make and model vehicle in a fleet, the TCU can be used on any vehicle in the fleet. Further, the device can be easily removed from one vehicle and reinstalled in another fleet vehicle at a later point in time. Once the TCU is reinstalled, the fleet management system can update the firmware and software so that the TCU is appropriately configured for the second (or subsequent) vehicle. Further, the TCU can be programmed to detect and report removal from the OBD II port of the vehicle, meaning that the management system can detect unauthorized action or tampering with the TCU.

The ease with which the TCU may be programmed or reprogrammed by the fleet management system provides many advantages. In addition to changing the programming when the TCU is installed in a subsequent vehicle, the TCU programming may be changed at different points in time, such that the TCU can operate in different operational "modes" in a single vehicle at different points in time. For example, in one mode, the TCU may be programmed to operate in a certain manner, permitting or prohibiting certain vehicle actions, and transmitting certain vehicle data and information at specific time intervals. In a different mode, the TCU may permit different vehicle actions, transmit different vehicle data and information, or transmit the vehicle data and information at different time intervals (or, for example, upon the occurrence of a specific event). This enables a single vehicle to be utilized in multiple fleet programs, such as a fleet rental program, a fleet sharing program, a corporate vehicle program or a municipal vehicle program. In each mode, different operations could be permitted, with different data and information transmitted to and from the management system. The fleet management system can set the vehicle mode by notifying the TCU and transmitting the applicable programming, meaning that a vehicle could be switched from one fleet or program to another fleet or program at a preselected time, or upon command by an administrator. The change from one mode to another would be actuated by commands transmitted to the TCU. The TCU may also be preprogrammed to automatically change modes in response to certain actions, such as where a vehicle is accessed with a designated card key or an access code transmitted via a wireless device, such as a mobile phone.

Depending on the vehicle mode, the TCU may control certain vehicle functions differently, such as methods for vehicle access. The mode may also control the vehicle data transmitted to the fleet management system, including the time for such transmission. For example, the TCU may be programmed to transmit data and information relevant to the current mode automatically upon the occurrence of certain events, such as upon vehicle access, upon movement of a vehicle, or at the start or conclusion of a rental or sharing period.

Additional advantages of the invention will be set forth in the description and claims which follow. It should be understood that both the foregoing general description and the following detailed description are exemplary and explanatory only and are not meant to be restrictive.

BRIEF DESCRIPTION OF THE DRAWINGS

The accompanying drawings, which are incorporated herein and constitute part of this specification, illustrate embodiments and together with the description, serve to explain the system, methods and apparatus of the invention.

DETAILED DESCRIPTION OF EXEMPLARY EMBODIMENTS

It is to be understood that the system, methods and apparatus of the present invention are not limited to specific components, network connections, or arrangements described and disclosed herein, as such may vary. It is also to be understood that the terminology used herein is for the purpose of describing particular embodiments only, and is not intended to be limiting.

As used in the specification and the claims, the singular forms "a," "an" and "the" include plural referents unless the context clearly dictates otherwise. Further, the terms "additional", "optional", "optionally", "may" and the like mean that the subsequently described operation, event or functionality mayor may not be required, and that the description includes instances where said operation, event or functionality occurs and instances where it does not. The word "comprise" and variations of that word, and the word "include" and variations of that word, mean "including but not limited to," and are not intended to exclude, for example, other components, steps, or operations. "For example" and "exemplary" mean "an example of" and are not intended to convey an ideal embodiment.

The system, methods and apparatus of the present invention include a programmable TCU for installation in a vehicle by attaching the TCU to the OBD II port of the vehicle. The TCU includes at least one processor and a chipset for providing cellular communication capability, thereby enabling the TCU to engage in two-way data communication via existing cellular telephone networks. Through this communication capability, the TCU may identify itself and the vehicle in which it is installed to the management system, and receive programming from the management system so that the TCU may be utilized in the particular vehicle in which it is installed. Upon installation, the TCU will detect vehicle identification information, and transmit that information to the management system. The management system, or a backend or subset system networked to the management system, can thereafter select the appropriate programming for the vehicle make and model identified by the TCU, and cause the management system to transmit firmware updates and programming to the TCU so that it may be properly configured for use in the installed vehicle.

Figure 1:
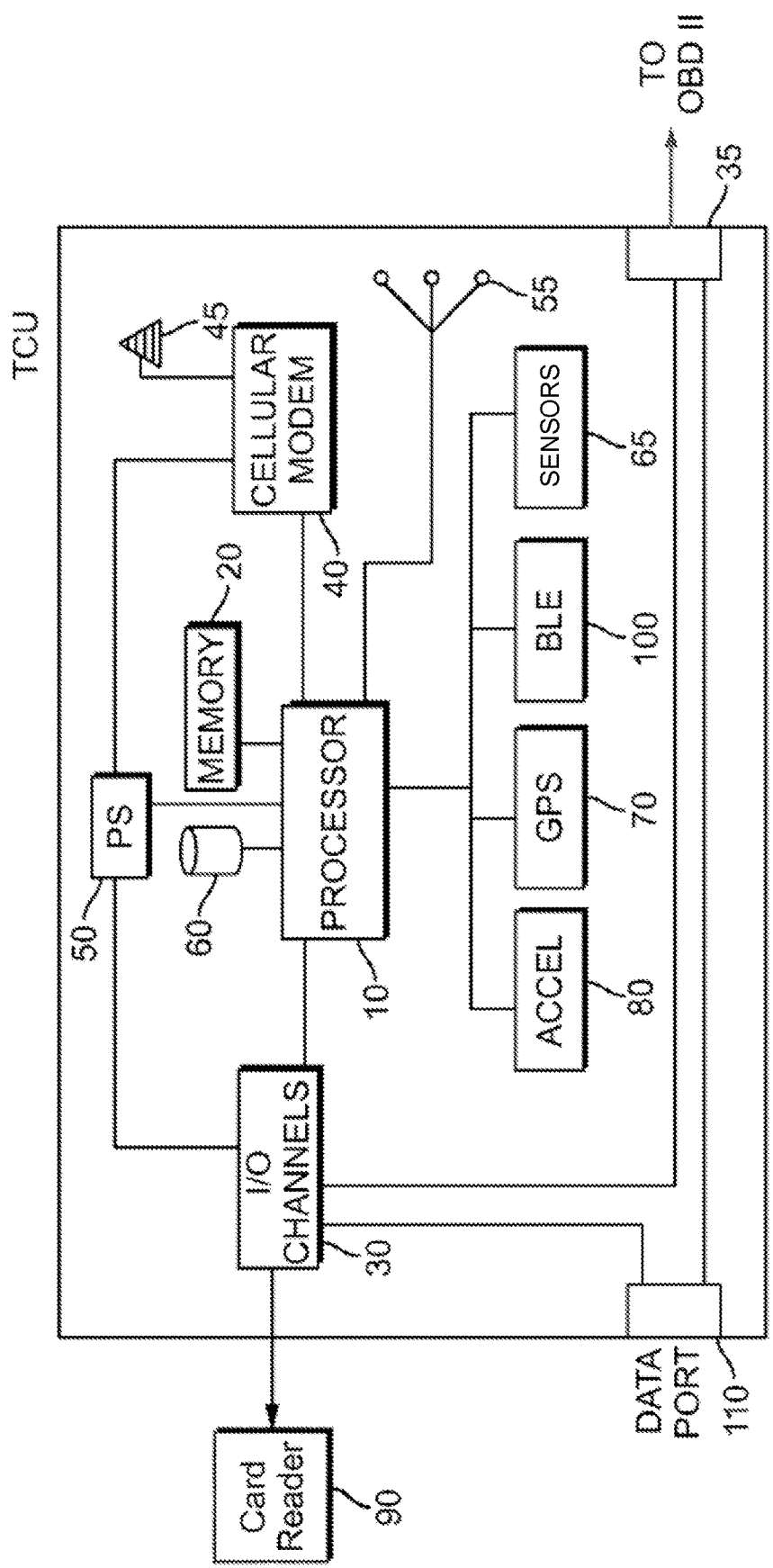
FIG. 1 is an exemplary depiction of a TCU in accordance with an embodiment of the present invention.

As shown in FIG. 1, the TCU includes at least one processor 10 for executing program instructions. The processor 10 can be coupled to removable/non-removable, volatile/non-volatile system memory 20 and computer data storage 60, for permanent or temporary storage of programming, and system and sensor data. The memory can store computer code, computer readable instructions, data structures, program modules, and other data. For example, and not meant to be limiting, data storage 60 can be a hard disk, a solid state drive, a magnetic disk, an optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Multiple processors, and multiple core processors, can also be provided.

The TCU includes I/O channels 30 for communication with the vehicle via the OBD II port via a connection at 35. These communication channels may be one-way or two-way, enabling communication via the OBD II device with vehicle sensors, processing systems and buses. These channels provide discrete signals that control the actuations of features like door lock/unlock, activation of the horn, and enabling or disabling the vehicle starter. These channels may also be used for control of actuations not present on the OBD II port of the car, via direct or wireless connections.

The TCU also includes a modem 40 and an associated antenna 45 enabling two-way cellular communication with the fleet management system. The modem 40 can comprise one or more communications components or modules, which can provide cellular or mobile data communication capability. The modem 40 can operate on any frequency available in the country of operation. Although 3G or 4G capability (or better) is preferred, the type of communication can include, but is not limited to, GPRS, EDGE, UMTS, 1×RTT or EV-DO, WiMAX, HSPAT, LTE and LTE Advanced standards. As an alternative, the TCU and modem could enable two-way satellite digital audio radio service via satellite communication networks.

The TCU is powered by the vehicle via the OBD II port connection. As an alternative, or in addition, the TCU can include a direct 12v power connection to the vehicle power source. The TCU also includes a power supply with a battery 50, to provide back-up power. The battery enables operation of the TCU, including cellular transmission of data, for a limited period of time in the event of a vehicle power loss or if the device is disconnected from the power source. The TCU is configured to sense the loss of power or data, and to determine whether that power or data loss is due to disconnection of the TCU from the OBD II port or a problem with the vehicle battery. For example, the cable between the TCU and the OBD II port can include a push-type switch on the connection plug, which would enable the TCU to determine whether the cable is plugged or unplugged, and to detect when it is unplugged. The TCU can also continuously monitor battery voltage, and can be programmed to report gradual voltage decay. The TCU can also check for power loss at the TeU power input pins, to determine whether the TCU is receiving power. Accordingly, if power loss occurs, the TCU will notify the management system that it is utilizing power from the battery 50. If the TCU reports that the OBD II cable is disconnected, the management system can thereafter determine if the disconnection of the TCU was authorized, for example where the vehicle is scheduled for servicing, or if the disconnection is not authorized. If the cable remains connected, and no voltage decay has been detected, the system can determine whether the power loss is within the TCU or within the vehicle by checking for power at the TCU input pins.

The TCU may also include one or more indicator lights 55, visible outside the device, to provide an indication of connection status and power. It may also include a buzzer or similar type of alarm, which can be programmed to activate when the TCU is installed, or in the event of loss of data or power connectivity. Different colors and patterns of lights can be utilized to indicate various issues with the device, and provide indications to an installer regarding success or failure of the installation.

Although the TCU is primarily designed to receive data and information from existing vehicle sensors via the OBD II port, the TCU may itself include additional sensors 65 and other technology to provide additional information to the fleet management system. The TCU may include a GPS unit 70, which includes a receiver that receives position information from a constellation of satellites, as is known in the GPS art. Additional technology can be incorporated into the GPS receiver to improve the accuracy of the equipment when the vehicle is located within metropolitan urban areas and in tunnels. For example, cellular triangulation, WiFi triangulation, and Bluetooth triangulation can be utilized. Data from the GPS unit can be read by the TCU and reported to the fleet management system on a continuous or periodic basis, or upon the occurrence of a specific event.

The TCU may also include an accelerometer 80, such as a three-axis accelerometer, to detect and report vehicle impacts and driving habits. This sensor capability enables the TCU to set programmable thresholds, and detect and report when the accelerometer readings exceed those thresholds. The thresholds can be set to detect and report vehicle impacts, aggressive braking or acceleration, or improper handling of the TCU. Such data may be used by the management system to monitor, evaluate or rate driver behavior, to detect accidents, or to trigger maintenance on the vehicle. The accelerometer data may also be combined with incline measurements to detect vehicle towing or tampering. Such sensors may be programmed as always-on sensors in order to detect impacts, towing, etc. even when the vehicle is not in use. Sensors installed in the TCU may also include their own processor capability. Additional sensors that could be incorporated into the TCU include, for example, light sensors, occupancy sensors, motion sensors, and vibration sensors.

Additional sensors and devices may also be installed in a vehicle, and directly connected to the TCU to provide additional system functionality. For example, the TCU may be connected to a card reader 90 installed on or in the vehicle to enable vehicle access by persons using an access card. The card reader may be installed on the windshield or in the dashboard to permit access to a vehicle without a key. The card reader can connect to the TCU via the I/O channels 30, via a dedicated interface such as a serial interface or a Wiegand interface, or through a wireless interface such as Bluetooth. Other devices that authenticate a user and permit access or activation of a vehicle may also be included, including, for example, a fingerprint reader, a touch-pad sensor or keyboard, a retina scan device, a breathalyzer (or other sobriety testing devices), and the like. Additional sensors and devices that can be installed in the vehicle on an after-market basis for communication with the TCU include an occupancy sensor, a smoke detector, and sensors to detect hazardous or illegal substances. If the vehicle includes a key storage compartment or lock-box, a sensor to detect the presence of the key, or a device to control access to the compartment, may also be installed and placed in communication with the TCU.

The TCU may further include dedicated short range communication capability, via a built in communication device 100. This technology will enable wireless local communication with the TCD. For example, if the dedicated short range communication technology includes Bluetooth capability, the TCU can enable keyless access to a vehicle, for example, via a Bluetooth-enabled mobile device, such as a smartphone or tablet. To utilize this technology, an authorized user can press a button, provide a code, or engage in other authentication schemes via a mobile device, thereby causing a wireless signal to be transmitted over a short distance and be received by the TCU dedicated short-range communication device. The TCU thereafter confirms whether the signal is valid and, if so, commands the vehicle to unlock the doors via the OBD II connection. Wireless short-range communication technology, standards and formats that can be utilized for this type of communication include, for example, Bluetooth, Bluetooth LE, ZigBee, RFID, NFC and WiFi Direct.

Short range communication technology may also be utilized to monitor vehicle location at a facility or to detect when a vehicle is returned to or removed from a facility. In one implementation, the TCU may act as a transmitter (beacon), and receivers positioned around the lot receive the transmitted signal and notify the management system of the position of the vehicle using wired or wireless protocols and communication capabilities built into the facility. A receiver may also be located at the exit gate of the facility, to permit egress of authorized vehicles, and to inform the management system that the vehicle is exiting the lot. The system can also be configured such that the management system transmits contract data to a gate agent when a vehicle approaches the exit gate, such that the gate agent can check for proper identification. In an alternate implementation, the TCU can act as a receiver, which receives information from beacons positioned at a facility and transmits location data to the management system via the TCU cellular connection.

Additional functionality can also be provided where the TCU includes short range communication capability. For example, a user with a Bluetooth enabled mobile device could activate vehicle components, such as flashing the lights or blowing the car horn in order to identify a vehicle in a lot. A user might also activate vehicle remote start technology remotely via a mobile device. A short-range RF enabled TCU, operating as a beacon, could be sensed by a user mobile device, and displayed on the user's device in a map showing the location of the user with respect to the vehicle, thereby assisting the user in locating the vehicle. Similarly, a short-range RF enabled TCU would permit the TCU to be located and tracked as a piece of equipment in inventory, when the TCU is not installed in a vehicle. Dedicated short-range communication capability would also enable the TCU to receive vehicle-to-vehicle, vehicle-to-infrastructure and positive train control technology warnings and communications, which could be forwarded to vehicle occupants, or transmitted to the management system via the TCU.

A TCU with short range communication capability would also enable peer-to-peer communication between TCUs in different vehicles. This is useful in managing a fleet of vehicles, as a TCU in one vehicle can communicate with the fleet management system via one or more TCUs installed in nearby vehicles. In this manner, two-way communication can be maintained between a vehicle and the fleet management system when the vehicle has no cellular communication capability due to malfunction or loss of signal. Through this chain of communication, the fleet management system can receive data from an out of communication vehicle and can transmit programming and instructions to that vehicle, via a nearby TCU or series of TCUs.

As shown in FIG. 1, the TCU also includes a data port 110. The data port enables access to the OBD II data for vehicle maintenance and diagnostic purposes, without the need to disconnect the TCU.

For ease of installation and programming, all of the components of the TCU are preferably housed together in a single, rigid, tamper-resistant case designed to be securely installed underneath the dashboard of a vehicle, with a cable connection to the vehicle OBD II port. However, certain components of the TCU could be housed elsewhere without departing from the spirit and scope of the invention. For example, the TCU could rely upon an accelerometer or a GPS unit located outside the TCU, including, for example, systems installed by the vehicle manufacturer. However, such configurations increase programming and installation complexity. Further, reliance on external systems and sensors make it more difficult to track the TCU and conditions associated with its transport, as these sensors could not provide data to the management system in the event the TCU is removed from the vehicle.

The TCU preferably includes a single processor. However, an alternative configuration may utilize two or more processors, each programmed to operate in a different vehicle mode. For example, one processor may be pre-programmed to operate in a vehicle rental mode, while a second processor is pre-programmed to operate in a vehicle sharing mode. In a dual processor configuration, a controller should be included to activate the appropriate processing system in accordance with the active mode set by the management system or through other means described herein.

The apparatus illustrated in FIG. 1 is exemplary, and is not intended to suggest any limitation as to the scope of use or functionality of operating architecture. Neither should the apparatus be necessarily interpreted as having any dependency or requirement relating to any one or combination of components illustrated therein.

Figure 2:
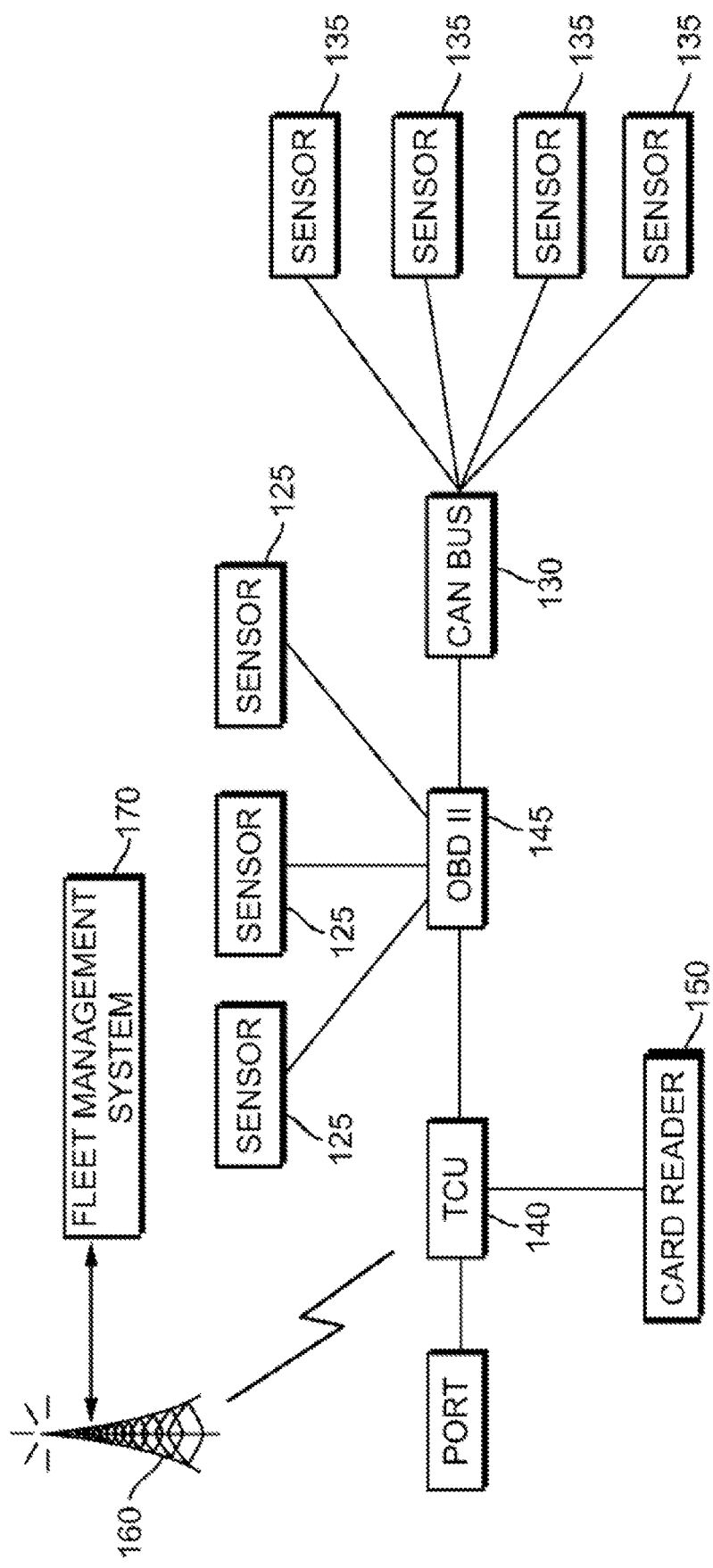
FIG. 2 is an exemplary depiction of a TCU installed in a vehicle in accordance with an embodiment of the present invention.

An exemplary depiction of a TCU installed in a vehicle is shown in FIG. 2. The OBD II is connected to vehicle sensors 125 and vehicle networks, such as the controller area network or CAN bus 130. Additional vehicle sensors, microcontrollers, a host computer, and other systems 135 are also connected to the CAN bus. The TCU 140 receives data and information from the OBD II port through a wired connection 145. Since the OBD II port is connected to the CAN bus, the TCU will have access to CAN bus data, information, systems and sensors. The TCU may also be connected to external sensors and devices added to the vehicle, such as a card reader 150. The TCU 140 communicates via cellular data network 160 with a fleet management system 170.

The TCU, interfacing with the vehicle via the OBD II port, can monitor various vehicle systems and sensors, determine vehicle conditions, and report data indicative of vehicle status and performance to the fleet management system, in accordance with TCU programming. This includes, for example, vehicle VIN, fuel level, odometer readings, vehicle battery level, door status, ignition status, tire pressure, headlight sense, window up/down status, seat adjustment status, radio station presets, operating temperatures, operating pressures, vehicle speed, engine fuel air mixtures, oil quality, wiper usage, break pad conditions, air-bag deployment, and other data from vehicle sensors and vehicle computer systems. The TCU can also receive and communicate data from in-vehicle communication devices and warning systems, such as vehicle-to-vehicle and vehicle-to-infrastructure communication devices and systems and positive train control technology. The TCU can also monitor and report DTC codes (diagnostic trouble codes), and malfunction indicator lamps. The TCU also monitors and reports data derived from TCU components and sensors, including GPS data, accelerometer data, and IMEI and SIM card numbers. The TCU processor monitors all of this data and information, formats and stores the applicable data in the memory and/or data storage device, and transmits data to the management system, all in accordance with TCU programming. Transmission of data may be programmed to occur on a continuous, periodic or event-driven basis, or a combination thereof. Different transmission timing can also be set in accordance with a particular vehicle TCU operating mode. The TCU processor can also employ data compression protocols and methodologies, such as MQTT protocols, in order to limit the amount of memory required or to minimize data transmission and the costs associated therewith.

Figure 3:
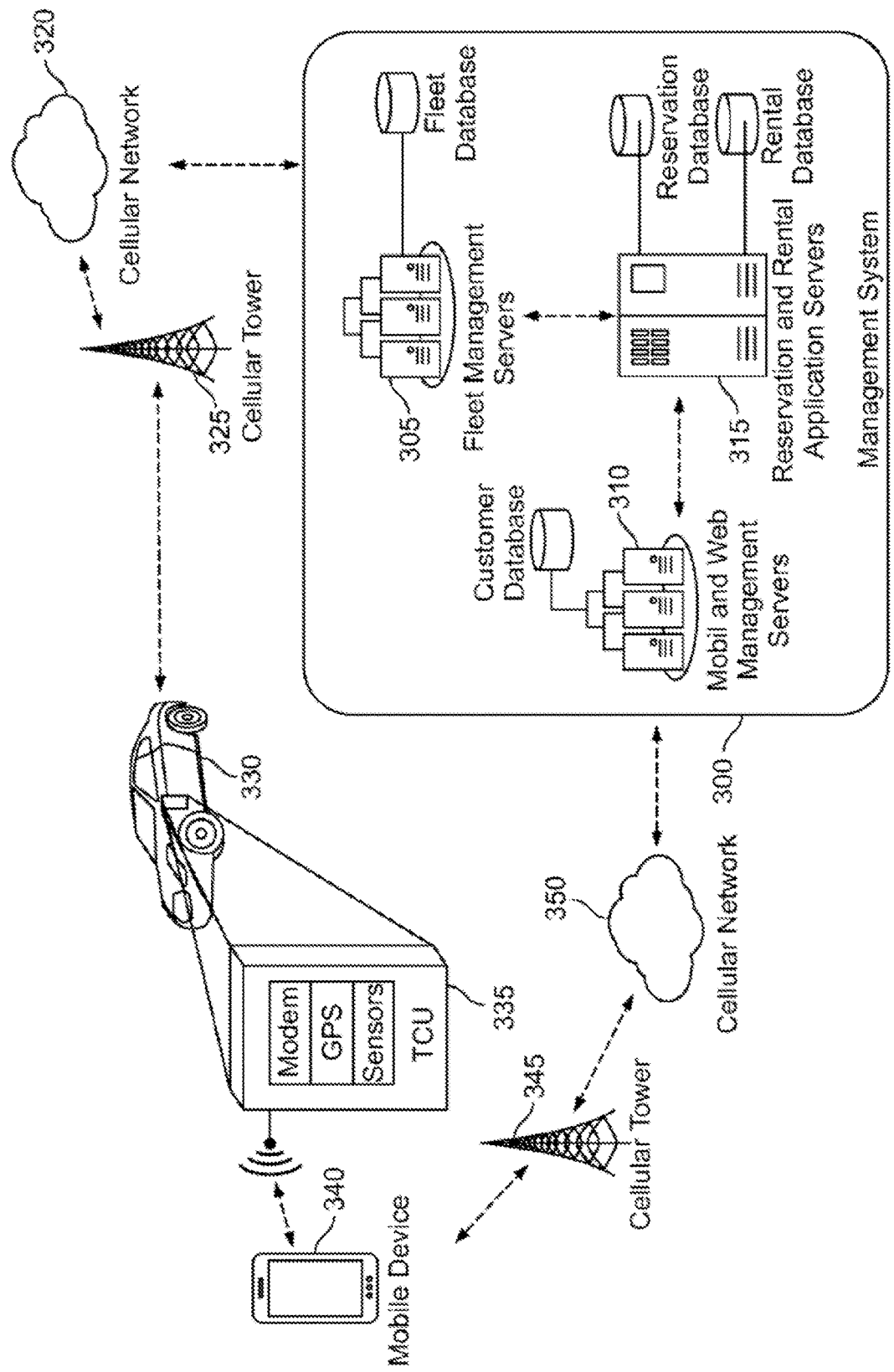
FIG. 3 is an exemplary depiction of a network environment including a vehicle, a TCU, and a fleet management system, in accordance with an embodiment of the present invention.

FIG. 3 depicts an example of a network environment employing the invention. As depicted therein, management system 300 includes a plurality of sub-systems including, or example, fleet management servers 305, mobile and web management servers 310 and reservation and rental application servers 315. Each subsystem may be connected to one or more databases and processors. The management system may also include a backend system where OBD II codes and protocols associated with different fleet vehicles may be managed and stored. The management system communicates via cellular networks 320 and cell towers 325 with TCUs installed in fleet vehicles 330. These communication systems enable two-way communication between the management system 300 and each TCU 335. The TCU 335 includes various hardware components including, for example, a processor, memory and data storage capability, sensors, and GPS technology. The TCU 335 also includes I/O channels for communication with sensors installed on the vehicle outside the TCU, and means to connect the TCU to factory installed vehicle sensors and systems, such a cable that connects the TCU to the vehicle OBD II port. TCU 335 also includes a modem and antenna, which enables communication between the TCU and cellular networks via cellular towers. Finally, TCU 335 may include short range communication technology which enables local communication with mobile devices 340, such as a user's mobile phone. The short range communication capability may enable the TCU to communicate with sensors positioned around a facility, and with TCUs installed on nearby vehicles as described above. Using a mobile device, an authorized person may communicate with a vehicle TCU 330/335 and remotely initiate certain vehicle actions. Separately, an authorized person may communicate with the management system 300 via a mobile device 340 having cellular communication technology, via cellular network connection 345, 350.

Figure 9:
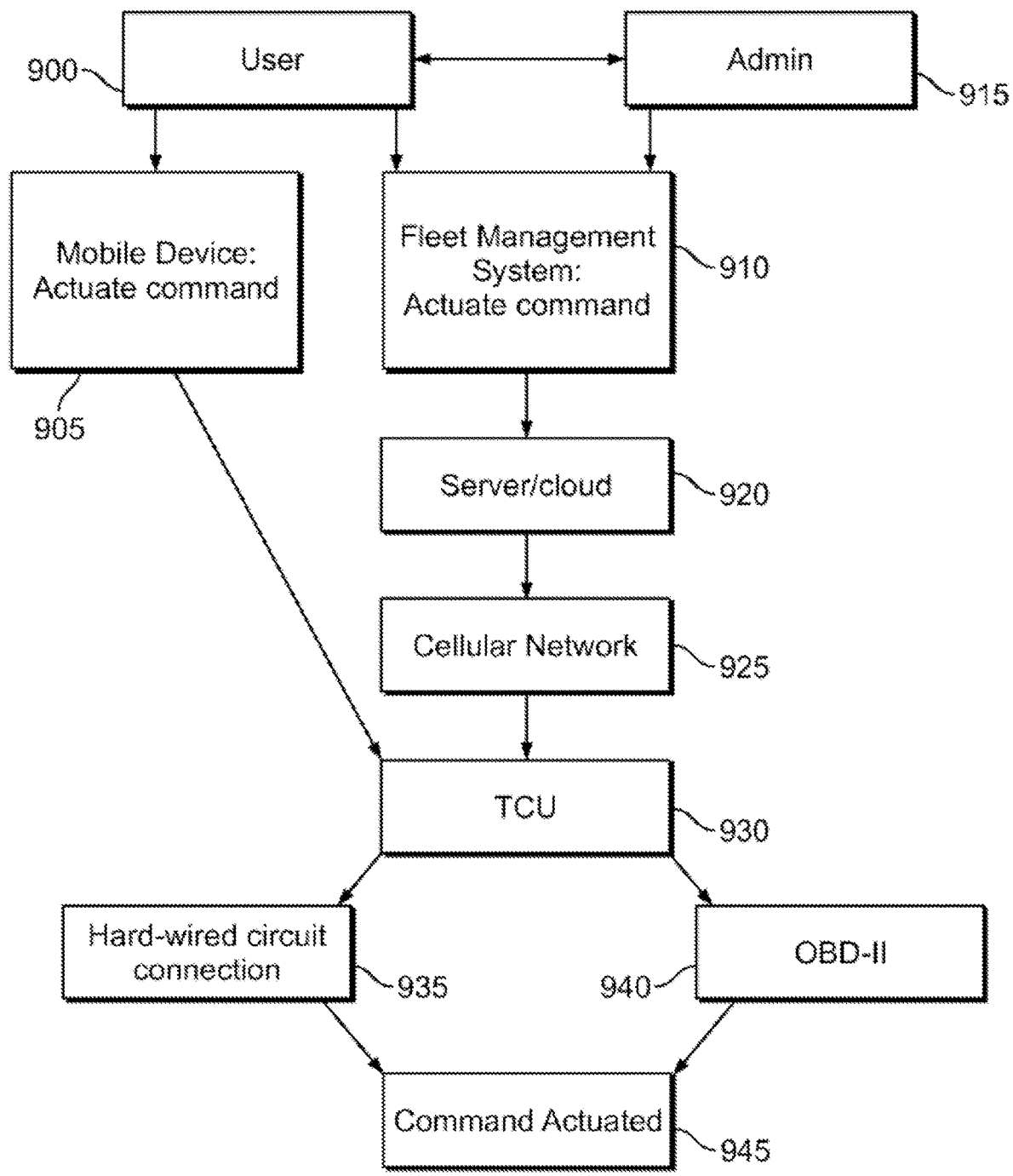
FIG. 9 is a flow chart depicting command-response communication in one mode of operation.

The TCU may receive request-response commands from the fleet management system, as depicted in FIG. 9. In response to such commands, the TCU can obtain data from vehicle sensors and systems, and provide responsive data communication to the fleet management system. Where the command entails activating a vehicle system, for example, a command to flash the lights or to open the door locks, the TCU may communicate with the appropriate system or device, initiate the requested action, inform the management system that the command was executed, and confirm the status of such system after executing the command (e.g., doors are now unlocked).

The TCU may also monitor sensors for event triggered actions, such as a low battery indication or a crash indication. When these indications are noted, the TCU automatically transmits a signal with the appropriate data to the fleet management system, where appropriate responses, such as scheduling the vehicle for maintenance or repairs, can be initiated.

An entire fleet of vehicles may be equipped with TCUs in accordance with the present invention, enabling the fleet management system to monitor the vehicles, collect data, execute commands within vehicles, and manage the vehicle fleet. The management system can be configured as a centralized system, or a distributed system. It can be operated in whole or in part in the cloud or on a series of servers. The fleet management system can include a plurality of sub-systems, including vehicle rental reservation management, vehicle sharing reservation management, fleet management, and vehicle maintenance management.

The TCU processor can control the TCU components to allow for easy integration into different types of vehicles. Therefore, although the TCU of the present invention is expressly intended for use with automobiles, it can be installed in other types of equipment such as, but not limited to, motorcycles, trucks, buses, trains, watercraft, aircraft, and the like.

The processor can also monitor TCU power consumption and limit consumption of power when desirable. For example, when the vehicle is experiencing normal operations, the TCU collects and transmits data to, and receives instructions from, the management system. However, when an extended period of vehicle non-use is detected, the TCU may initiate a low-power mode where the TCU minimizes data collection, and cellular communications are curtailed in order to limit the risk of vehicle battery drain. However, even in a low-power mode, cellular communications should be initiated periodically so that the device can receive programming and related information. In the event that the TCU is disconnected from the OBD II port, the TCU may enter an extreme low power mode, for example, where it communicates with the management system solely to report that its location and an indication that it has been disconnected from the OBD II port.

The TCU of the present invention may be programmed so that a vehicle can be operated in different vehicle modes. The system, methods and apparatus of the present invention enable the device to be toggled between these different modes through a number of different actions, including via pre-programmed instructions, commands issued by the management system, or in response to certain actions of an authorized person. Accordingly, vehicles equipped with these TCUs may be used in multiple fleet programs, or switched from one program to another to in response to demand. In these different modes, different vehicle operations may be permitted or curtailed. For example, the TCU may be programmed to operate in a "rental mode," where the vehicle is available as part of a rental program. The TCU may be programmed, when a vehicle first enters this mode, such that the doors are unlocked, the starter is enabled, and the alarm is disconnected, as the vehicle would normally be located at a rental facility, controlled by the fleet manager. This vehicle may be accessed by a user holding a rental reservation, started with a traditional car key, and driven off a lot after the driver's identification is confirmed. In this mode, vehicle data such as mileage and gas levels are monitored and transmitted periodically to the fleet management system. At the completion of the rental period, when the vehicle is returned to the rental lot, the TCU may be programmed to transmit final mileage and fuel levels to the management system for invoicing/billing purposes. Completion of a rental reservation may be noted automatically when the vehicle arrives at the lot via an RF enabled TCU or via the GPS system, or manually by a lot attendant.

The TCU may also be toggled to a "sharing mode." In the sharing mode, the TCU may be programmed such that the vehicle doors are locked, the vehicle starter is disabled, and the alarm is activated, as vehicles in a sharing program are typically stored in a location that is not controlled by the fleet manager. In the sharing mode, a user may access the vehicle and enable the starter without a key, for example, by waving an access card key over the vehicle card reader. Other access methods may also be utilized. The TCU confirms that the access action is authorized by matching the received data with data transmitted by the management system to the TCU in advance of the sharing reservation period.

Figure 4:
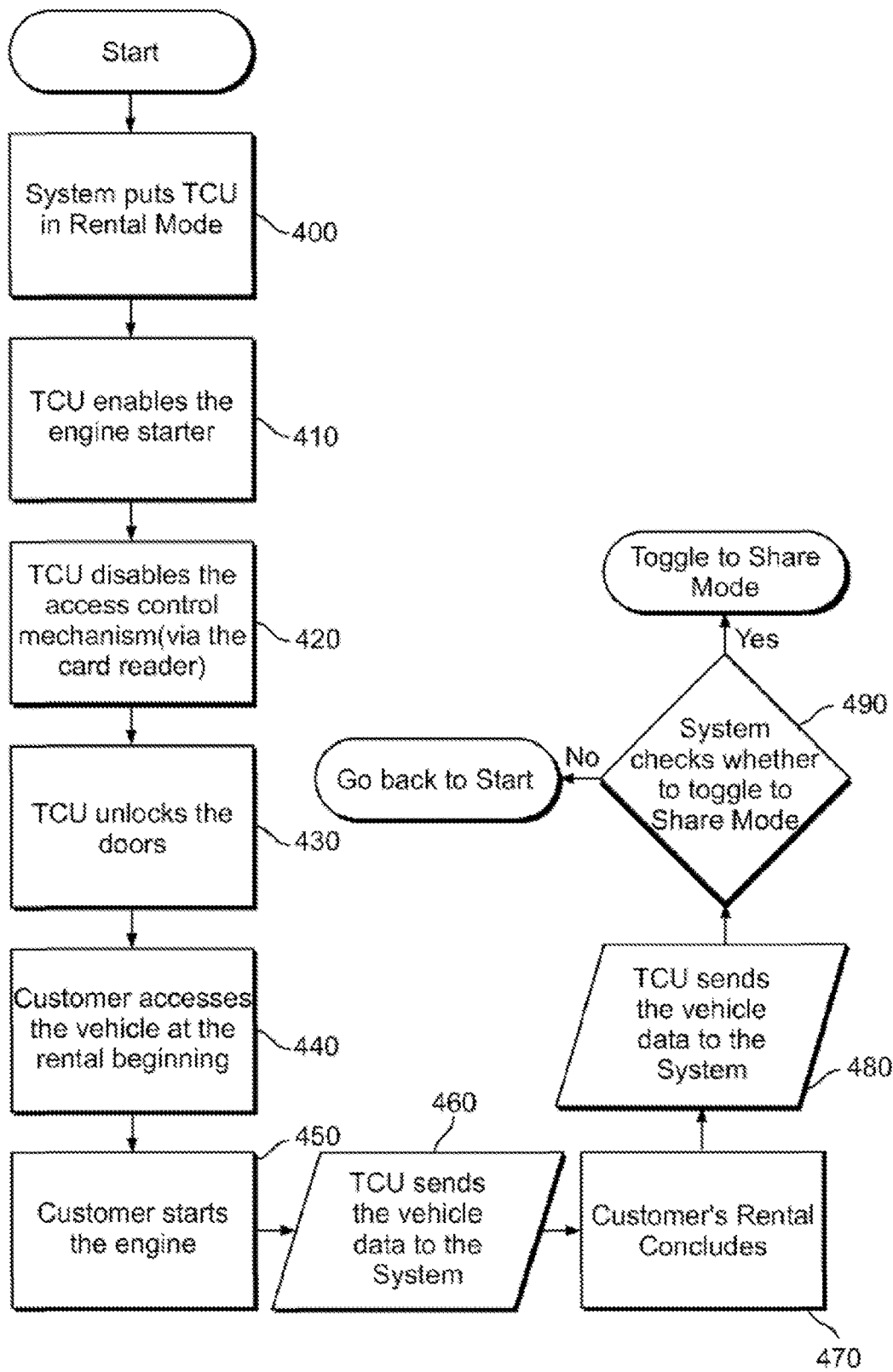
FIG. 4 is a flow chart of an exemplary method of operation pertaining to a vehicle in rental mode in accordance with an embodiment of the present invention.

FIG. 4 shows an exemplary flow chart wherein a vehicle TCU is toggled to a rental mode 400. In this mode, the vehicle is stored in a rental lot, which is typically a controlled location. Here, the vehicle may be left unlocked, with the starter enabled, so that the user may gain easy access and start the vehicle. In this mode, the TCU enables the engine starter 410, disables the access control device 420, such as a card reader, and unlocks the doors 430. When the rental period begins, a user accesses the vehicle 440, and starts the engine 450. The TCU notes that the doors were accessed and the vehicle started and transmits this data to the management system 460. The TCU may also inform the management system of the vehicle fuel level and odometer reading, and any other pertinent data that the system owner desires the fleet management system to collect. If the lot includes an exit agent, data may be transmitted to that agent so that the driver's identification may be checked. In the alternative, the exit gate may be opened via the local communication capability previously described. The TCU operating in conjunction with the GPS unit may also report that the vehicle is leaving the rental lot location.

During the rental reservation period, data may be collected, monitored and transmitted by the TCU, in accordance with rental mode programming. At the conclusion of the rental period 470, for example when the GPS unit detects that the vehicle has entered a rental facility, the TCU will inform the management system of the vehicle location, and will report vehicle odometer and fuel level readings 480. This data may be used by the management system when it generates an invoice for the rental contract. Once the rental period has concluded, the TCU will check whether the vehicle is to remain in rental mode, or if it is to be toggled to the share mode 490. If the vehicle is to remain in rental mode, the TCU may confirm that the doors have been left unlocked. If the doors have been locked, the TCU may automatically unlock the doors.

Figure 5:
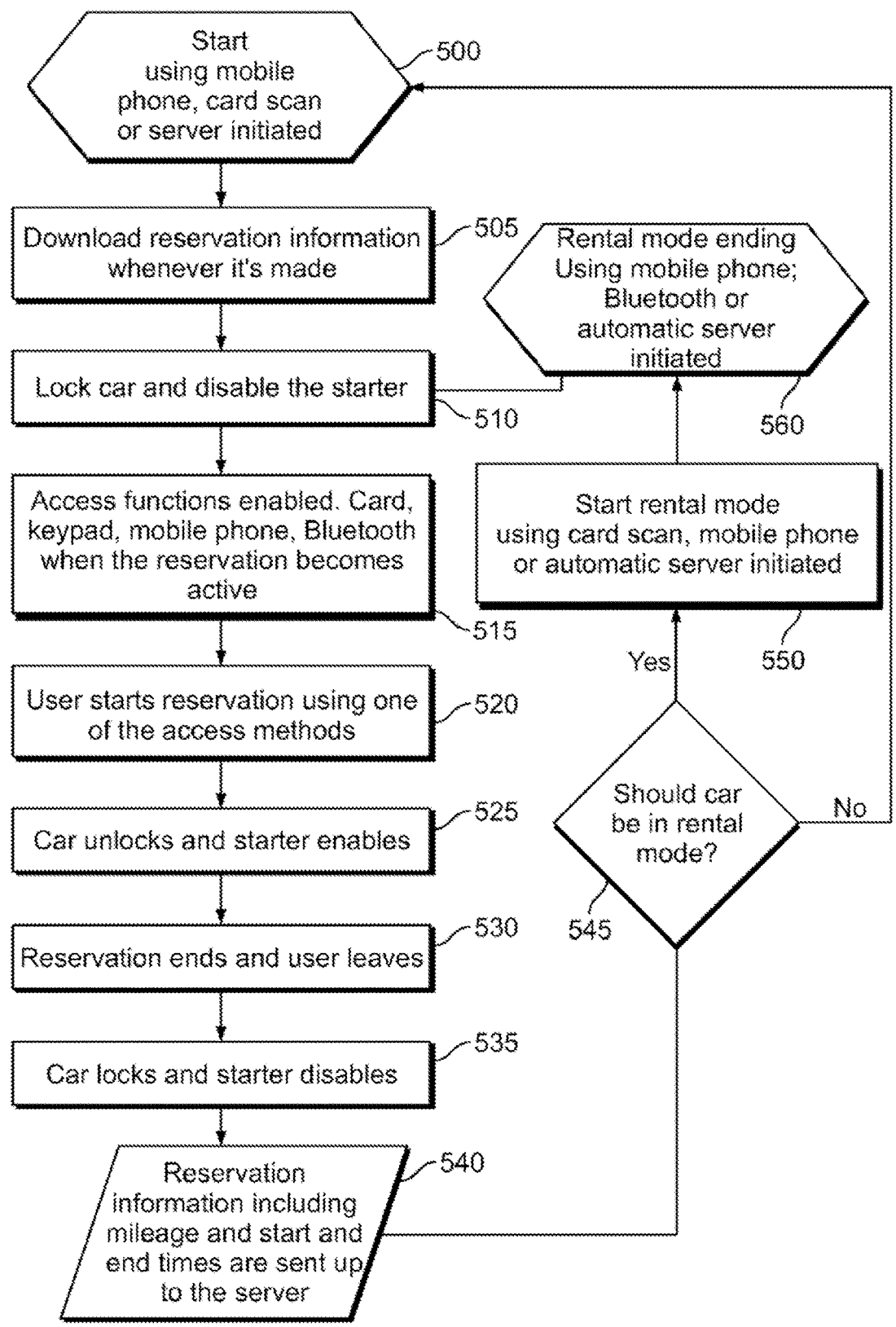
FIG. 5 is a flow chart of an exemplary method of operation pertaining to a vehicle in sharing mode in accordance with an embodiment of the present invention.

FIG. 5 shows an exemplary flow chart wherein a vehicle is toggled to and operating in a sharing mode. First, a sharing reservation 500 is received by the system. At the appropriate time, typically before a user seeks to access the vehicle, information about the reservation is downloaded to the TCU of the vehicle associated with the reservation 505. In this manner, the user associated with the reservation can access the vehicle with a card key (or other access device) at the appropriate time, even where the TCU is out of communication with the management system. If the vehicle is being put into sharing mode, the TCU locks the doors and disables the starter 510. At the appropriate time, the TCU enables sharing mode access functions 515, such as the card reader. When the assigned user seeks to access the vehicle using an appropriate access method 520 the reservation starts. Access to the vehicle is provided and the starter is enabled 525. During the reservation period, data may be collected, monitored and transmitted by the TCU, in accordance with sharing mode programming. When the share period ends, and the user leaves the vehicle 530, the TCU ensures that the doors are locked and it disables the starter 535. The TCU also transmits certain data to the management system 540, such as vehicle mileage, fuel level and reservation start and end times. Thereafter, the management system determines whether the vehicle is to stay in sharing mode 545. If so, the process is repeated for the next sharing reservation. If it is determined that the vehicle is to be toggled to the rental mode 550, programming associated with the rental mode is transmitted to the TCU so that vehicle operational functions, and desired TCU data collection and transmission protocols, can be initiated. Once the rental mode ends 560, the management system repeats the process of determining whether the vehicle is to stay in rental mode, or be toggled to the sharing mode.

A user may access a vehicle and start a share reservation via a card key, a mobile device or other technology such as a fingerprint scan or entry of an appropriate code on an access panel. Once the TCU determines that the access attempt is valid and associated with the reservation, access will be permitted. The user can thereafter drive away in the vehicle. If the access attempt is not authenticated, such as where the card key is not authorized, access will not be permitted and the starter will remain disabled. If access is permitted, the TCU will inform the management system that access was gained via the method utilized, and that the vehicle has left the storage location. If the vehicle is in a garage, the TCU may be unable to communicate with the management system because a cellular connection is unavailable. In such case, the TCU may be programmed to permit access to and vehicle operation by the cardholder associated with the received reservation information, and will report access and operation to the management system as soon as communication is re-established. If communication is not re-established within a certain period of time after access and operation begins, further operation of the vehicle may be curtailed.

When a sharing reservation is concluded, the TCU will inform the management system where the vehicle is located, and will confirm that the doors have been locked. In the event that the doors are not locked, or if the trunk is left open, the TCU may be programmed to flash the vehicle lights and/or honk the horn to remind the user to close the trunk and/or lock the doors. The doors may also be automatically locked by the TCU if the car is set to remain in sharing mode and the TCU determines that they are unlocked.

A vehicle TCU can be toggled into different modes in a variety of ways. The fleet management system can designate different vehicles for different programs according to demand, as reservations are taken for different programs or in advance based upon known demand patterns. For example, in New York City, business travelers utilize rental vehicles during weekdays and local residents utilize shared vehicles during weekends. In accordance with the present invention, vehicles can be toggled between both programs to accommodate this demand by designating certain vehicles for use in the sharing program during weekends, and for use in the rental program during weekdays.

The fleet management system may toggle a TCU upon command, such as when a user without a reservation arrives at a facility to rent or share a vehicle. A TCU may also be toggled in response to a user action, such as when a fleet management employee with certain privileges tries to access a vehicle via the card reader. If the card holder has appropriate privileges, the vehicle may be toggled to the appropriate mode automatically by the TCU, and access provided immediately. The mode can also be changed by fleet personnel via Bluetooth or NFC enabled mobile technology. Further, the mode can be set automatically based upon the location of a vehicle via RF or cellular communication between the TCU and the facility or the management system, such as when a vehicle arrives at a location associated with a particular program.

It is envisioned that the TCU could be set for additional modes, including modes not described herein. In each case, sensor data and communication appropriate for that mode may be collected and transmitted by the TCU. For example, a vehicle might be toggled for use a corporate or municipal pool for a certain period of time. In these modes, the TCU can enable (or preclude) vehicle access via an access card. Programming might not require transmission of fuel level data to the management system, as such data might not be necessary for vehicles assigned to a corporate pool for a period of time. On the other hand, a mode could be created for a specific entity wherein fuel level data is electronically reported to that entity after each use of each vehicle so that the entity can manage refueling of all vehicles in the fleet. If a vehicle is operated as part of a corporate fleet, or is operated in regions of the country or world where travel into certain areas is restricted, such as locations near a border, the TCU mode can utilize geo-fencing to ensure that the vehicle is operated only within permitted regions. In the event such programming is implemented, and a user seeks to take a vehicle to a region that is not permitted, the management system will detect this movement via the location provided by the GPS unit, and a violation of the "fenced" territory can be triggered. Further, via two-way communication with the TCU, the management system could prohibit such travel, for example, by immobilizing the vehicle if a user enters prohibited territory. Geo-fencing could be executed within the TCU, if sufficient memory and processing capability is provided, or within the fleet management system, working in conjunction with GPS data supplied by the TCU. For certain types of fleets, GPS could be used, consistent with applicable laws and disclosure requirements, to monitor or track routes taken by drivers, or the timing of certain activities, which may be essential information in a corporate or municipal program.

If the vehicle is to be used outside the United States, in certain regions of the world such as the European Community, laws and current practices may require different programming. For example, in certain countries, it is essential that vehicle doors remain locked whenever a vehicle is parked. In other countries, users may access a vehicle with a card key, and subsequently access a vehicle with a key stored in a storage compartment within the vehicle. Further, collection and transmission of certain reservation data, location data, or driving habits may be restricted in certain parts of the world. By toggling the vehicle TCU to a mode created specifically for use of the vehicle in such country or region, the invention enables a fleet manager to comply with such laws and practices as needed, while not restricting the use of the vehicle to that location or program. As can be seen, use of a programmable TCU, which can operate in different vehicle modes to provide different TCU functionality at different points in time, on a vehicle by vehicle basis, enables a single fleet of vehicles to be used in a variety of different vehicle programs. This enables the fleet owner to more efficiently manage use of fleet vehicles.

Figure 6:
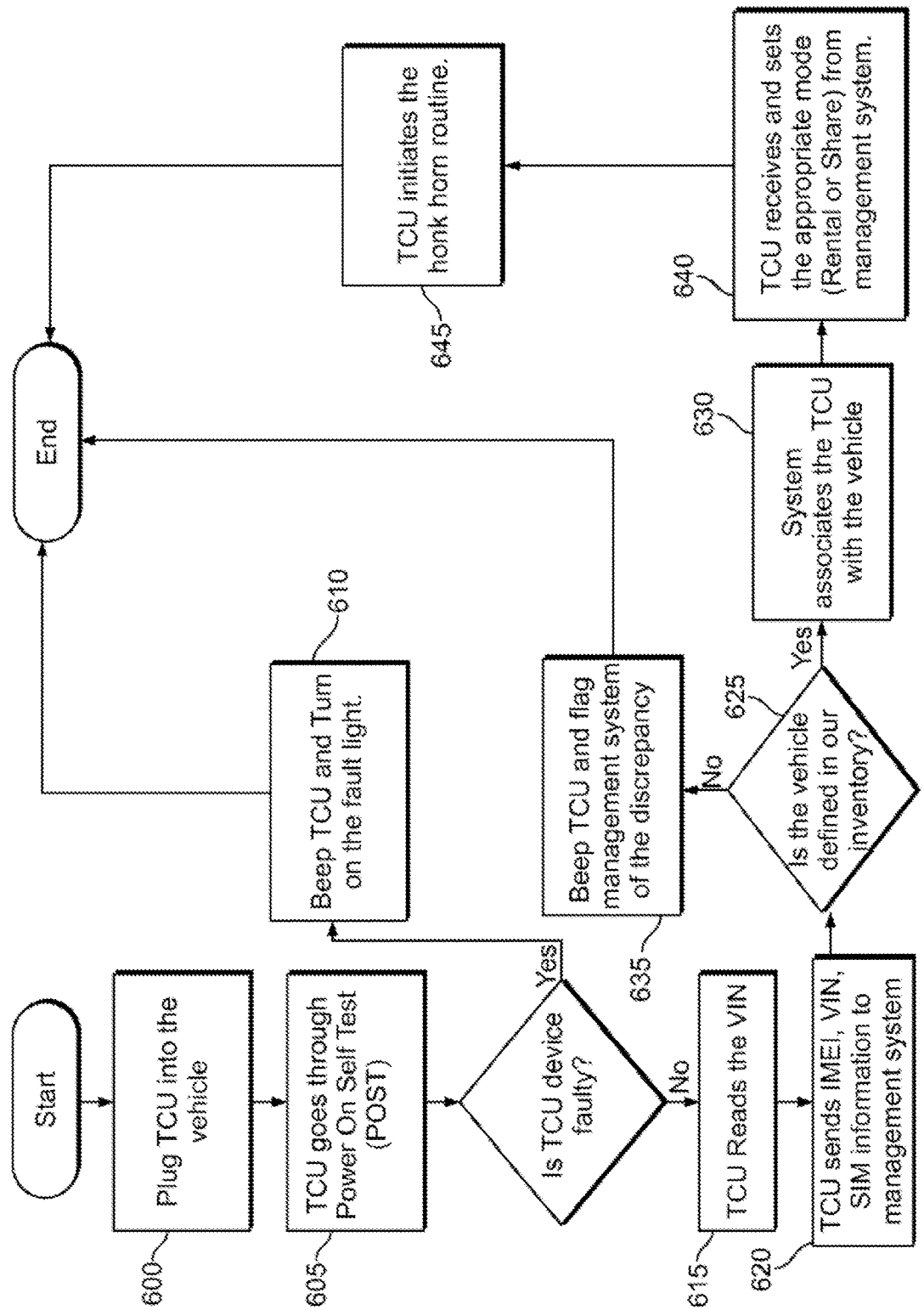
FIG. 6 is a flow chart of an exemplary method of installing a TCU.

FIG. 6 provides an exemplary flow chart showing the steps that may be undertaken to install and activate a TCU. First, the TCU is attached beneath the vehicle dashboard and plugged into the vehicle 600. Next, the TCU will initiate a power on self-test 605. If the device is faulty, a fault light or alarm is activated 610. If the TCU passes the test, the TCU will read vehicle VIN information 615. Next, the TCU transmits the VIN, together with TCU IMEI and SIM information, to the management system 620. In the alternative, the system may check for a difference between that VIN and the last VIN on record in the TCU. If there is no change in VIN, no further action is taken.

In the management system, it is determined if there is a vehicle corresponding to the VIN in the fleet inventory 625. If so, the management system will associate the TCU with the appropriate vehicle 630, and transmit appropriate instructions to operate the TCU in the vehicle make and model in which it is installed. If the VIN is not recognized, or if the IMEI or SIM is not recognized, the system flags the TCU data for further evaluation and notifies the installer of the discrepancy 635. Thereafter, the management system sets the TCU mode 640, and notifies the installer that installation is complete 645. The TCU may inform the installer that installation is complete via certain actions in the car, such as flashing the lights, changing the status of a TCU LED, or activating the car horn.

Figure 7:
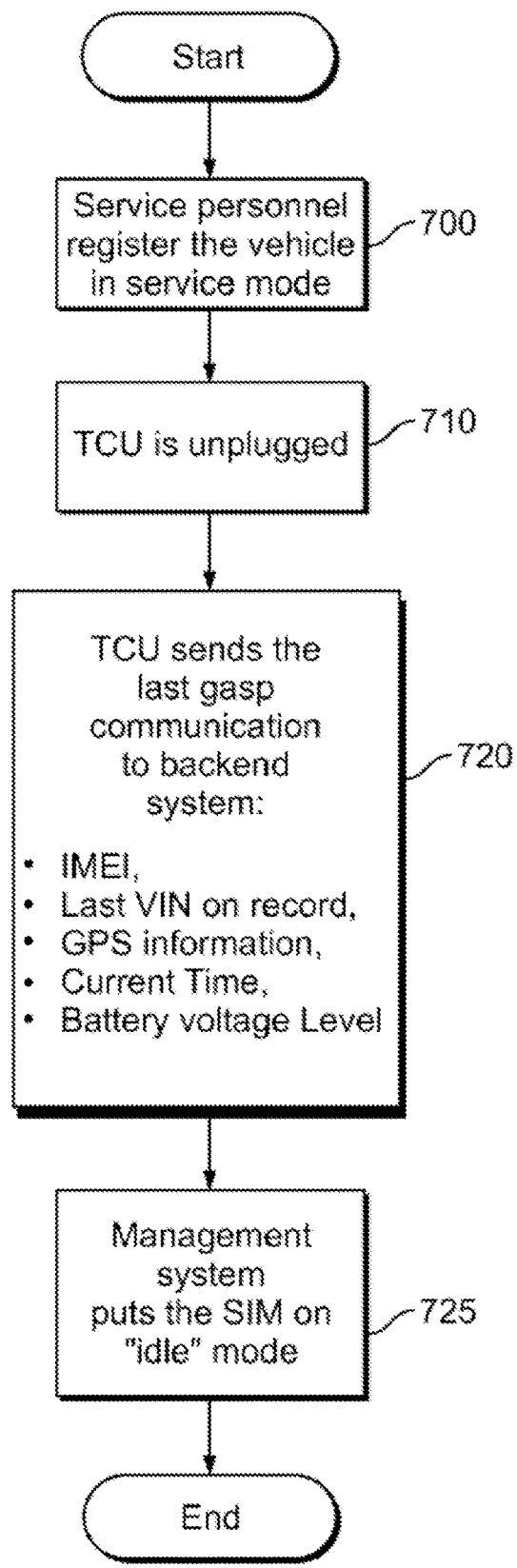
FIG. 7 is a flow chart of an exemplary method of re-installing a TCU.

FIG. 7 depicts a chart showing de-installation of a TCU. When a TCU is to be disconnected, service personnel would normally inform the management system that the vehicle is going into a service mode 700. When the TCU is unplugged from the vehicle 710, the TCU transmits a signal to the management system noting that it has been unplugged, along with the last VIN on record, the TCU IMEI, the current time, the battery voltage and GPS location 720. The management system thereafter verifies that disconnection was intended. If so, the TCU is listed in a table of TCUs not currently installed. Where intended, the SIM associated with the TCU may be placed in an idle mode, so that further data charges are restricted 725. If TCU disconnection was not authorized, the disconnection can be flagged for further action.

Figure 8A:
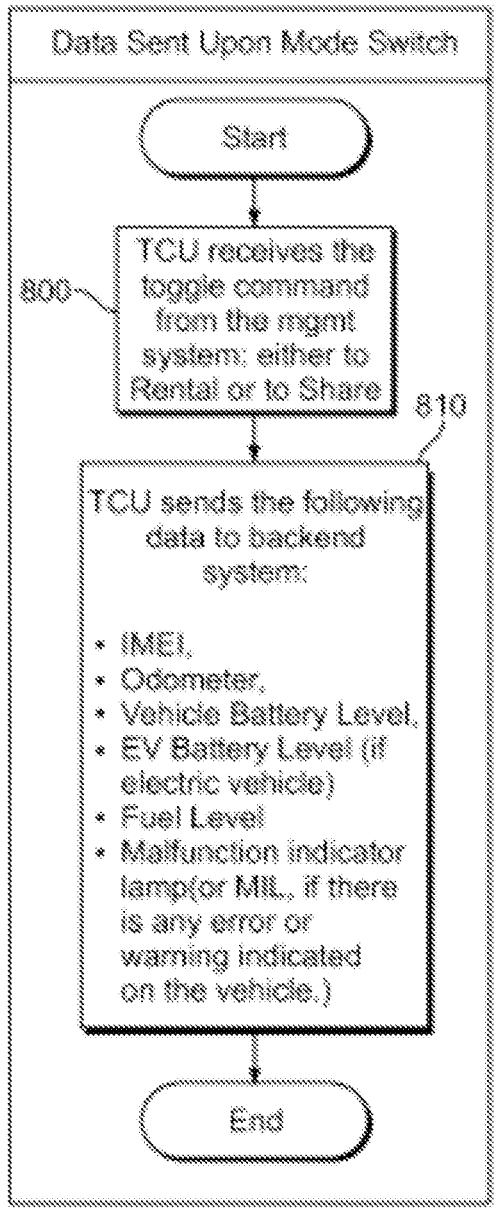
FIGS. 8A and 8B illustrate data transmission of an exemplary mode of operation.
Figure 8B:
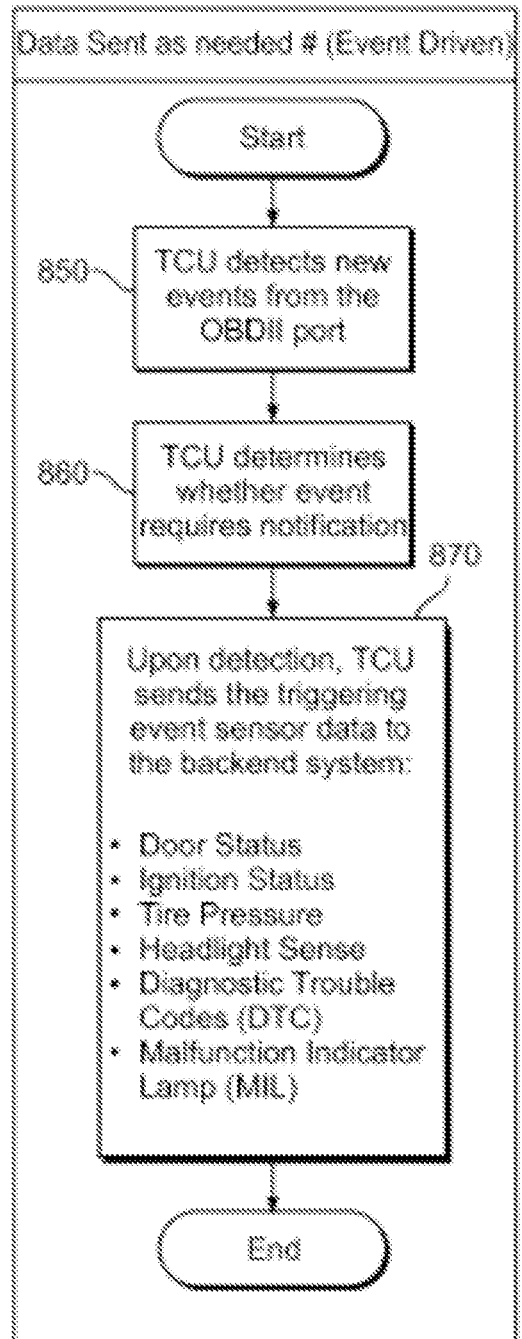

FIGS. 8A and 8B depict representative data that may be communicated by the TCU upon mode switch, or as needed, respectively. As shown in FIG. 8A, a TCU may be programmed so that when it is toggled to a mode 800, such as the rental mode, or the share mode, it will transmit the following data and information 810: IMEI, odometer reading, vehicle battery level, fuel level, malfunction indicator lamp. The TCU can be programmed to transmit the same or different data when the TCU is first put into a new mode, depending on system needs and the data desired in such mode. As depicted in FIG. 8B, the TCU may be programmed to transmit certain data and information on an event driven basis. At 850 the TCU detects a new event. The TCU determines, according to TCU programming, whether that event needs to be transmitted to the management system 860. If the event needs to be transmitted, the TCU sends the sensor data (including any additional data that programming requires it to send) to the management system 870 along with the TCU IMEI information or the vehicle VIN. The TCU may send additional relevant data, such as door status, ignition status, tire pressure, headlight sense, diagnostic trouble codes, and malfunction indicator lamp status.

FIG. 9 depicts exemplary steps undertaken by the invention in connection with command-response communications through which a user or a system administrator may remotely command the TCU to take some action. In this example, a request can be made by a user 900 via a mobile device in communication with the TCU 905, via communication between the user and the fleet management system 910, or via communication between the user and a person having administrator privileges 915. A person with appropriate privileges 915 could also initiate a command via the fleet management system 910 or via a RF command. Once a command is initiated, it is communicated to the TCU 930 directly via local communication, or via a cellular network connection 920/925. The TCU then executes the command via the OBD II port connection 940 or via hard-wired circuit connection 935. These connections enable the TCU to obtain sensor data or activate a vehicle device or system 945, such as door locks, vehicle lights, the horn, and the like. Once the command is activated, the TCU may also confirm that the command has been activated and provide responsive or confirmation information, such as sensor data or system status to the management system. Thus, the TCU may report that the doors are locked/unlocked, the lights have been flashed, the horn activated, and the like.

Command-response actions may be limited in accordance with the operable TCU mode. For example, in rental mode, users may be prohibited from activating commands, or certain administrator commands may be prohibited, such as locking of doors or activating the alarm. The fleet management system may also prohibit certain command-response actions by location. For example, a facility manager in one location may be precluded from initiating certain actions or obtaining data from a TCU in a vehicle located at a distant location.

The data communicated by the TCU enables a fleet operator to manage the vehicle fleet in numerous ways. For example, sensor status and data can be transmitted by the TCU modem via the cellular network to the fleet management system where it can be accessed, analyzed, and shared with the other systems. For vehicles in a rental fleet, or when vehicles are being operated in a rental mode, ease of access can be assured, and applicable data such as fuel level and mileage can be automatically sensed and transmitted to the management system, integrated into a vehicle rental record, and incorporated into a rental invoice generated at the conclusion of a rental, without requiring a rental system employee to manually check the fuel status and mileage.

Where vehicle sensors detect vehicle components requiring maintenance, such as a low battery indication, the fleet management system can interface with electronic maintenance and repair systems to schedule the vehicle for appropriate and timely maintenance or repair. The system can also ensure that no reservations are made for that vehicle during the period of scheduled maintenance. Notification of repairs needing immediate attention can also be provided to the user.

If certain sensors indicate a vehicle emergency has occurred, such as a collision, the management system can detect these conditions and notify fleet administrators so that appropriate action can be taken, such as notifying authorities. In the event that an emergency is detected, GPS location data can be automatically transmitted, or requested and obtained from the TCU, so that local emergency responders can be dispatched to the vehicle location reported by the GPS system.

Where accelerometer readings exceed thresholds, the TCU can communicate this information to the management system, where further analysis of sensor data can be undertaken to determine where the user has engaged in inappropriate driving behavior. If so, the management system may then flag the vehicle for physical inspection, for evidence of vehicle misuse or damage. The fleet management system may also store sensor data and other information in order to evaluate driver behavior and driving characteristics for a wide variety of purposes. For example, this data could be used for a rating system, in which future vehicle pricing or insurance coverage requirements are based upon behavior patterns noted for a particular type of vehicle, in a given location, at a given time of year. Consistent with current law and disclosure requirements, such data could be used for preferred pricing, discounts and other bonuses for drivers who exhibit safe driving characteristics. Similarly, drivers who exhibit certain behaviors may be barred from future vehicle use, or may be notified that inappropriate or improper use of the vehicle has been detected.

Sensor data may also be used to monitor vehicle performance for maximizing fleet economics. Vehicle operational data and information, such as oil sensor data and fuel economy readings, may be utilized in connection with fleet vehicle maintenance. Vehicle use conditions can also be monitored such that vehicle driven in heavy traffic, or in geographic regions with excessive dust, can be scheduled for more frequent maintenance. Sensor data can also be used in connection with economic decisions, such as determining which vehicles are subject to greater abuse or higher accident rates. Such information can be used by the fleet owner in connection with vehicle use pricing decisions, vehicle and user insurance decisions, and in determining whether certain vehicles should be discontinued from a fleet.

Programmable two-way communication between the TCU and the management system further enables the fleet operator to provide numerous value-added services for fleet customers. For example, for electric vehicles in a fleet, the TCU can monitor battery levels and remind a user via a mobile device when a charge is required. If so, the system may direct the user to a nearby charging location. The TCU can also report battery levels to the management system, enabling the management system to determine whether the vehicle will need to be recharged before it is provided to the next user. In sharing mode, the management system may utilize battery level information to direct the user to an available charging location at the time of vehicle return to ensure that vehicle charging takes place in advance of the next use of the vehicle. If the user cannot locate a vehicle, the TCU can be commanded to activate the car lights or the horn. In the event that a parking space is not available to a share customer seeking to return a vehicle, the TCU and/or the management system may detect the location of the user via the GPS system, and direct the user to a nearby alternate lot. The management system could also utilize vehicle GPS data transmitted through the TCU to direct a user to nearby available parking spaces during a rental or share period. The system could provide similar notification for available nearby fleet facilities, such as cleaning or maintenance facilities. Finally, in-vehicle systems such as a satellite radio system, a GPS/navigation system, or an entertainment system may be activated remotely via management system communication with the TCU, such as where there is a wired or wireless connection between the in-vehicle system and the TCU, including the vehicle CAN bus and OBD II port.

One skilled in the art will appreciate that the fleet management system described herein can utilize servers and databases located on one or more computers and in storage media and devices at one or more locations, including a central computing system, such as a mainframe computing system, or a distributed computing environment where various tasks are performed by remote processing devices that are linked through a communications network. These can include public, private or hybrid cloud computing network environments. In a distributed computing environment, program modules can be located in both local and remote computer systems, and in storage media and devices. The management system can operate in a networked environment using logical connections to one or more remote computing devices, such as, for example, a personal computer, a portable computer, a mainframe computer, a server, a network computer, a cloud-based application or computing device, a mobile device, a peer device or another common network node, and so on. Logical connections between the computer and a remote computing device can be made via a local area network (LAN), a wide area network (WAN), or the Internet.

While the foregoing system, methods and apparatus have been described in connection with preferred embodiments and specific examples, it is not intended that the scope be limited to the particular embodiments set forth herein, as such embodiments are intended in all respects to be illustrative rather than restrictive. Further, it will be apparent to those skilled in the art that various modifications and variations can be made without departing from the scope or spirit of the invention. Other embodiments will be apparent to those skilled in the art from consideration of the specification and practice disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

What is claimed is:

1. A system for controlling the operational mode of vehicles in a vehicle fleet, comprising:
 a telematics control unit adapted to be installed in a vehicle in a vehicle fleet, wherein said telematics control unit comprises a processor to execute computer readable code embedded on a tangible, non-transitory computer readable storage medium, a connection to an OBD II port of said vehicle, a connection to a vehicle access device, and a cellular modem enabling transmission of vehicle data and receipt of programming;
 wherein said telematics control unit is programmed for proper operation for the make and model of the vehicle in which it is installed;
 further wherein said telematics control unit is programmed with at least one of a plurality of available vehicle operational modes;
 a fleet management system including a processor for transmitting data to and receiving data from said telematics control unit;
 an application module associated with the fleet management system, enabling the remote selection of a desired vehicle operational mode for said telematics control unit, and when the desired vehicle operational mode is different from a current vehicle operational mode with which the telematics control unit is programmed, transmitting new programming associated with the desired vehicle operational mode to the telematics control unit, such that, after transmission of the new programming, the telematics control unit and vehicle may be operated in accordance with the desired vehicle operational mode without removal of the telematics control unit from the vehicle.

2. The system of claim 1, wherein the available vehicle operational modes comprise at least two of a vehicle rental mode, a vehicle sharing mode, a corporate fleet mode, and a municipal fleet mode.

3. The system of claim 2, wherein the available vehicle operational modes comprise a vehicle rental mode and a vehicle sharing mode.

4. The system of claim 3, wherein at least some vehicle operations permitted or prohibited while in vehicle rental mode differ from operations permitted or prohibited, respectively, while in vehicle sharing mode.

5. The system of claim 1, further wherein the fleet management system processor, if the vehicle specific programming on the telematics control unit does not match the make and model of the vehicle in which the unit is installed, transmits to the telematics control unit specific programming matching the make and model of the vehicle.

6. The system of claim 1, wherein the vehicle may be remotely switched from one vehicle operational mode to another by the fleet management system.

7. The system of claim 1, wherein the vehicle is remotely switched from one vehicle operational mode to another in response to a command input to the selected vehicle via an access card or wireless device and transmitted to the fleet management system by the telematics control unit installed in the vehicle.

8. The system of claim 1, wherein the telematics control unit further comprises one or more sensors or systems for generating data for transmission to the fleet management system.

9. The system of claim 1, wherein the telematics control unit further comprises an RF modem and chipset for short range communications.

10. The system of claim 9, wherein one or more of the plurality of vehicle operational modes enable the telematics control unit to unlock or lock a vehicle in response to an authorized Bluetooth command received via the RF modem of the telematics control unit.

11. The system of claim 1, wherein one or more of the plurality of vehicle operational modes enable one or more vehicle device actuations.

12. The system of claim 11, wherein the vehicle device actuations include one or more of door lock, door unlock, vehicle lights on, vehicle lights off, horn activation, alarm activation, starter disabled, and starter enabled.

13. The system of claim 1, wherein the telematics control unit is connected to the access control device via a wired or wireless connection separate from the OBD II connection.

14. The system of claim 13, wherein the access control device is a card reader and the telematics control unit actuates vehicle doors locks.

15. The system of claim 1, wherein the connection to the OBD II port is a wired connection and includes means for sensing whether the wire is connected to the port.

16. The system of claim 1, wherein said telematics control unit further comprises a GPS system within the telematics control unit.

17. The system of claim 1, further wherein the telematics control unit is programmed with an idle mode, wherein data communications to and from the telematics control unit in idle mode are restricted.

* * * * *